US012028796B2

(12) United States Patent
Kunjar et al.

(10) Patent No.: US 12,028,796 B2
(45) Date of Patent: Jul. 2, 2024

(54) GPS-ASSISTED COLLABORATIVE AND SIGNALING-AIDED WLAN DFS OPERATION (71) Applicant: Cypress Semiconductor Corporation, San Jose, CA (US)

(72) Inventors: Dhruvaraja Kunjar, Munnekolala (IN); Vinoth Sampath, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 454 days.

(21) Appl. No.: 16/299,850

(22) Filed: Mar. 12, 2019

(65) Prior Publication Data
US 2020/0296659 A1 Sep. 17, 2020

(51) Int. Cl.
*H04W 48/16* (2009.01)
*G01S 7/02* (2006.01)
(Continued)

(52) U.S. Cl.
CPC ............. *H04W 48/16* (2013.01); *G01S 7/023* (2013.01); *H04W 4/021* (2013.01); *H04W 72/30* (2023.01); *H04W 4/48* (2018.02); *H04W 84/12* (2013.01)

(58) Field of Classification Search
CPC ... H04W 48/16; H04W 4/021; H04W 72/005; H04W 4/48; H04W 84/12; H04W 4/40;
(Continued)

(56) References Cited

U.S. PATENT DOCUMENTS

| 6,697,013 B2 | 2/2004 | McFarland et al. |
| 7,944,886 B2 | 5/2011 | Stephenson et al. |

(Continued)

FOREIGN PATENT DOCUMENTS

| GB | 2559591 A | 8/2018 |
| JP | 2015211263 A | 11/2015 |

(Continued)

OTHER PUBLICATIONS

International Search Report for International Application No. PCT/US2020/013949 dated Mar. 31, 2020, 3 pages.
(Continued)

*Primary Examiner* — Michael Thier
*Assistant Examiner* — Jose L Perez (57) ABSTRACT

Disclosed are methods and systems for a WLAN device to select an operating dynamic frequency selection (DFS) channel that minimizes the probability of radar interference by using aiding information. The aiding information may be a crowd-sourced database of geo-tagged radar zones including one or more DFS channels used within the geo-tagged radar zones that are detected by a plurality of WLAN devices. The WLAN device may query the crowd-sourced database for a geo-tagged radar zone that is nearby to determine if a radar operates on an overlapping DFS channel so it may switch to a different channel. In one aspect, the aiding information may be periodic special action frames broadcast by a WLAN beaconing device over the operating channel of the WLAN device. The special action frames may carry information on one or more channels used by a near-by radar and recommended alternative channels to use by the WLAN device.

16 Claims, 8 Drawing Sheets (51) Int. Cl.
*H04W 4/021* (2018.01)
*H04W 72/30* (2023.01)
*H04W 4/48* (2018.01)
*H04W 84/12* (2009.01)

(58) Field of Classification Search
CPC ....... H04W 48/14; H04W 4/02; H04W 4/024; H04W 16/14; H04W 72/082; H04W 72/0453; H04W 72/30; H04W 72/541; G01S 7/023
See application file for complete search history.

(56) References Cited

U.S. PATENT DOCUMENTS

| | | | |
|---|---|---|---|
| 8,116,687 | B2 | 2/2012 | Patel et al. |
| 8,228,884 | B2 | 7/2012 | Yamaura |
| 8,805,420 | B2 | 8/2014 | Kenney et al. |
| 8,982,831 | B2 | 3/2015 | Crowle et al. |
| 9,258,760 | B2 | 2/2016 | Nagai et al. |
| 9,408,087 | B2 | 8/2016 | Kurucz et al. |
| 9,713,155 | B2 | 7/2017 | Negus |
| 9,736,845 | B1 | 8/2017 | Yi et al. |
| 9,877,251 | B2 | 1/2018 | Stager et al. |
| 9,999,055 | B2 | 6/2018 | Ngo et al. |
| 10,182,770 | B2 | 1/2019 | Asianto et al. |
| 10,880,903 | B1* | 12/2020 | Tsai ................... H04L 41/12 |
| 2003/0050012 | A1* | 3/2003 | Black .................. H04W 72/02 455/62 |
| 2003/0206130 | A1* | 11/2003 | Husted .................. G01S 7/021 342/159 |
| 2004/0033789 | A1* | 2/2004 | Tsien ................... H04W 36/06 455/130 |
| 2004/0151137 | A1 | 8/2004 | McFarland et al. |
| 2005/0059363 | A1 | 3/2005 | Hansen |
| 2006/0258296 | A1* | 11/2006 | Steer .................... H04K 3/822 455/227 |
| 2007/0112511 | A1 | 5/2007 | Burfeind et al. |
| 2009/0160696 | A1 | 6/2009 | Pare et al. |
| 2010/0105332 | A1* | 4/2010 | McHenry ............. H04W 16/14 455/62 |
| 2012/0083218 | A1* | 4/2012 | Gossain ............... H04B 17/318 455/67.11 |
| 2013/0252640 | A1* | 9/2013 | Kenney ................. H04W 48/16 455/456.4 |
| 2013/0314267 | A1* | 11/2013 | Kenney .................. G01S 7/021 342/21 |
| 2014/0323086 | A1 | 10/2014 | Wheeler et al. |
| 2014/0378179 | A1* | 12/2014 | Nagai .................... H04W 72/02 455/509 |
| 2016/0337868 | A1 | 11/2016 | Kenney et al. |
| 2017/0041954 | A1* | 2/2017 | Tsai ........................ G01S 7/021 |
| 2017/0094651 | A1* | 3/2017 | Green .................. H04B 7/2123 |
| 2017/0134961 | A1 | 5/2017 | Ghosh et al. |
| 2017/0150368 | A1* | 5/2017 | Ngo ...................... H04W 64/00 |
| 2017/0156149 | A1* | 6/2017 | Lin ....................... H04W 4/021 |
| 2017/0181002 | A1* | 6/2017 | Ngo .................. H04W 72/0453 |
| 2017/0188293 | A1 | 6/2017 | Mizusawa |
| 2017/0208474 | A1* | 7/2017 | Mody ..................... G01S 7/003 |
| 2017/0245280 | A1* | 8/2017 | Yi ............................. H04K 3/00 |
| 2017/0329449 | A1 | 11/2017 | Silverstein et al. |
| 2018/0013627 | A1 | 1/2018 | Jeanne et al. |
| 2018/0059213 | A1 | 3/2018 | Wallstedt et al. |
| 2018/0192422 | A1* | 7/2018 | Yi .......................... G01S 7/021 |
| 2018/0359730 | A1 | 12/2018 | Jung et al. |
| 2019/0101620 | A1* | 4/2019 | Reis ........................ G01S 3/00 |
| 2019/0132709 | A1* | 5/2019 | Graefe ............. G08G 1/096716 |
| 2019/0215058 | A1* | 7/2019 | Smyth ................. H04B 7/18502 |
| 2019/0215837 | A1* | 7/2019 | Dutta .................. H04L 43/0876 |
| 2019/0223067 | A1* | 7/2019 | Bahr .................. H04W 72/0453 |
| 2019/0246324 | A1* | 8/2019 | Cizdziel ........... H04W 36/0088 |
| 2019/0364598 | A1* | 11/2019 | Ringland .......... H04W 74/0816 |
| 2021/0136590 | A1* | 5/2021 | Aktas ..................... H04L 69/14 |

FOREIGN PATENT DOCUMENTS

| | | | | |
|---|---|---|---|---|
| JP | 2017063404 A | | 3/2017 | |
| WO | WO-03090037 A2 | * | 10/2003 | ............. H04B 17/23 |
| WO | 2013179397 A1 | | 12/2013 | |
| WO | WO-2016110046 A1 | * | 7/2016 | ............ H04W 36/06 |

OTHER PUBLICATIONS

Written Opinion of the International Searching Authority for International application No. PCT/US2020/013949 dated Mar. 31, 2020, 6 pages.

"Dell EMC Netowrking Ruckus R310 Access Point," Dell Inc, Jun. 2018, pp. 1-96; 96 pages.

"HiveOS," Aerohive Networks, Jan. 2018, pp. 1-4; 4 pages.

"Portal WiFi," portalwifi.com, Ignition Design Labs LLC, Nov. 2017, pp. 1-13; 13 pages.

Japanese Office Action from Application 2021-554998 dated Mar. 19, 2024; 8 pages.

* cited by examiner

GPS-ASSISTED COLLABORATIVE AND SIGNALING-AIDED WLAN DFS OPERATION

TECHNICAL FIELD

The subject technology generally relates to wireless local area network (WLAN) systems, and more particularly, to systems and methods for devices or vehicles that operate in WLAN dynamic frequency selection (DFS) channels to minimize interference to co-existing radar systems.

BACKGROUND

WLAN systems complying with the IEEE 802.11 standard may operate in the 2.4 GHz, 5 GHz, or higher frequency bands. Channels in the 5 GHz band are classified based on their allowed usage as indoor or outdoor channels. WLAN outdoor channels in the 5 GHz band are increasingly being used in automobiles for in-vehicle networking as well as in automobiles to exchange information with each other and to receive information from system infrastructure to aid autonomous driving and other applications. In some countries, some if not all of the WLAN outdoor 5 GHz channels are also used by radars, e.g., weather, military, and civilian radars. These 5 GHz channels where WLAN and radar operations coexist are referred to as dynamic frequency selection (DFS) channels. A WLAN device that has the capability to detect the presence of radars in the operating frequency, and can guide its connected network members away from the radar's operating frequency, is called a WLAN DFS mater device. A WLAN device that lacks this capability and depends on the master device for operating in the DFS channels is called a slave device.

To minimize interference by the WLAN devices on radars, regulatory authorities in many jurisdictions impose stringent requirements on the behavior of WLAN devices operating in the DFS channels. For example, before a WLAN DFS master device can start transmitting in a WLAN DFS channel, it is required to perform a radar scan, called a channel availability check (CAC), to detect radar signals. This CAC may last from 1 minute for civilian radars, to 10 minutes or more for weather and military radars. During the CAC, the WLAN DFS master device may be prohibited from performing any WLAN operation. If no radar signal is detected, the WLAN DFS master device may operate in this channel. During operation, the WLAN DFS master device is required to constantly monitor for any radar signals in the same channel in a process called in-service monitoring (ISM). If a radar signal is detected anytime during the CAC or ISM in a DFS channel, the WLAN DFS master device is expected to quickly move away to a different channel. If this second channel is also another DFS channel, the WLAN DFS master device may have to perform the CAC and ISM again until a DFS channel free of radar signals is found.

Radars may transmit a narrow beam of radio pulses that revolves 360 degrees around the radars. As automobiles are continuously moving, a WLAN DFS master device deployed on an automobile may not be able to accurately detect radar signals compared to a stationary device. Even if the WLAN DFS master device detects a radar signal, information gathered about the detected signal may be outdated when the automobile moves to a different location. Inaccurate and outdated radar detection and signal information contributes to unreliable WLAN DFS operation, which may in turn lead to increased interference to radar operation. In addition, the disruption to the WLAN operation of the WLAN DFS master device during the long CAC period used to scan for radar signals results in network outage for the WLAN operations of end users on the slave devices.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Examples of various aspects and variations of the subject technology are described herein and illustrated in the accompanying drawings. The following description is not intended to limit the invention to these embodiments, but rather to enable a person skilled in the art to make and use this invention.

In one aspect of the subject technology, a database of radar interference sources may be collected from wireless local area network (WLAN) devices deployed on one or more automobiles and queried by a WLAN device in the field to assist the WLAN device to select an operating dynamic frequency selection (DFS) channel that minimizes the probability of radar interference. In one embodiment, the information on radar interference may be crowd sourced by automobiles operating in the field equipped with WLAN devices that support reporting of radar signal information detected on DFS channels. The WLAN devices, such as the WLAN DFS master devices, may detect the presence of radar signals, and may report information such as the locations of detection, DFS channels used, time of operation, etc., to a centralized server that consolidates the reported information into a database. A WLAN device on an automobile, including a slave device without the capability to detect radar signals, wishing to operate in a DFS channel may query the database to obtain information on potential radar signals nearby to select a DFS channel with a reduced probability of radar interference.

In one embodiment, the database of radar interference may be stored locally in a WLAN device or on an automobile instead of being located at a centralized server. The WLAN device may store information on detected radar interference over time into the local database. The WLAN device may query the local database as the automobile approaches a location to steer free of DFS channels with potential radar interference. Advantageously, by leveraging the database of radar information either remotely or locally, the need for channel availability check (DFS-CAC) may be reduced and WLAN operation may continue without interruption due to a DFS-CAC scan.

In another aspect of the subject technology, a dedicated WLAN beaconing device located at the boundary of a radar interference range may broadcast DFS beacons or special action frames to advertise or warn WLAN devices on automobiles approaching the radar interference range of the radar operation and to steer free of the DFS channel used by the radar. The WLAN beaconing device may broadcast periodic special action frames carrying information about the DFS channel used by a nearby radar, range of the radar interference or GPS coordinates of the boundary of the radar interference range, recommended DFS candidate channels for WLAN devices to switch to, etc. The WLAN beaconing device may broadcast the special action frames on the same overlapping WLAN DFS channel as the radar signal but outside the boundary of the radar interference range so the action frames do not interfere with the radar operation. A WLAN device operating in the same DFS channel as the radar signal may receive the special action frames as the automobile approaches the boundary of the radar interference and may switch to a different DFS channel before it enters the radar interference range. Advantageously, because the special action frames are received as WLAN packets, both DFS master device and slave devices may quickly and reliably switch to a different DFS channel to steer free of DFS channels carrying radar signals.

Figure 1:
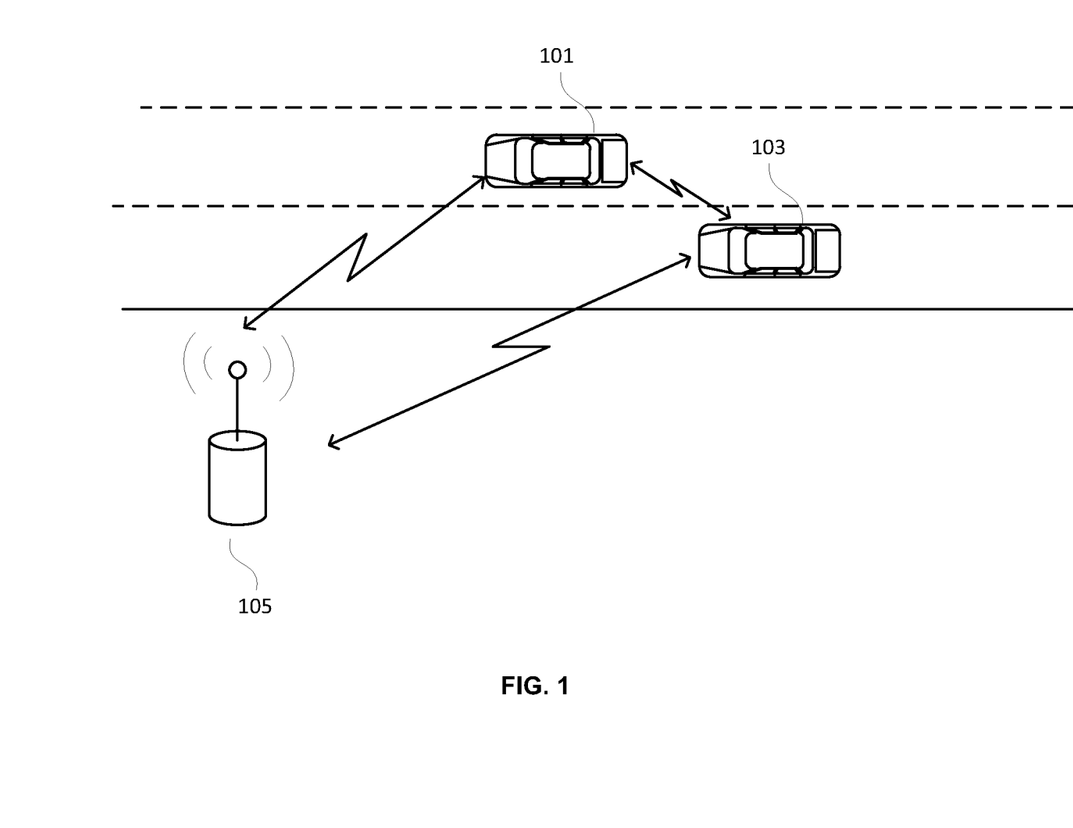
FIG. 1 illustrates an example outdoor wireless local area network (WLAN) architecture deployed for automobiles, in accordance with some embodiments of the present disclosure.

FIG. 1 illustrates an example outdoor wireless local area network (WLAN) architecture deployed for automobiles, in accordance with some embodiments of the present disclosure. WLAN devices may be deployed in automobiles 101 and 103 to communicate using the IEEE 802.11 standard. The WLAN devices may be user stations (STAs) configured to associate with an access point (AP) 105 deployed by the road when the automobiles 101 and 103 come within a range of the AP 105. The WLAN devices in automobiles 101 and 103 and the AP 105 may form a basic service set (BSS). Once associated with the AP 105, the WLAN devices may receive information such as road condition, traffic condition, environmental and other infrastructure information from the AP 105 to assist the automobiles 105 and 103 in navigating the road. In one scenario, the automobiles 101 and 103 may exchange vehicle information such as speed, heading, etc., in peer-to-peer communication using the WLAN devices without routing the data traffic through the AP 105. The automobiles 101 or 103 may use the information received from one another, and/or from the AP 105 to facilitate autonomous driving. In another scenario, the automobile 101 may host a SoftAP or a Peer-to-Peer Group Owner (P2P GO) to which in-vehicle WLAN clients (e.g., mobile phones with WLAN capability carried by passengers or in-vehicle entertainment consoles of passenger seats) inside the automobile 101 may connect to, through which infotainment contents may be exchanged.

The WLAN system may operate on one or more 5 GHz WLAN DFS channels shared with radar systems. The WLAN device in automobiles 101 or 103 may be a WLAN DFS master device configured to detect the presence of radar signals in an operating channel and may guide itself and connected slave devices without the radar detection capability away from the operating channel if radar interference is detected. The WLAN DFS master device may be required by regulation to perform a DFS-CAC scan for a minimum period of time to ensure a DFS channel is free from radar interference before the WLAN DFS master device may start operating in the channel. During operation after the DFS-CAC is clear, the WLAN DFS master device may still be required to constantly monitor for any radar signals in the operating channel using in-service monitoring (ISM). If a radar signal is detected anytime during the CAC or ISM in a DFS channel, the WLAN DFS master device and the connected slave devices are expected to quickly move away to a different channel. To aid a WLAN device in selecting a DFS channel that has a reduced probability of radar interference and to reduce interference on radar operation caused by the WLAN device, aiding information on radar interference may be provided to the WLAN device.

Examples, implementations, and embodiments described herein are primarily described in the context of a WLAN. In one embodiment, the WLAN system may be a WLAN network using various versions of the IEEE 802.11 standard. However, other WLAN system may be contemplated.

Figure 2:
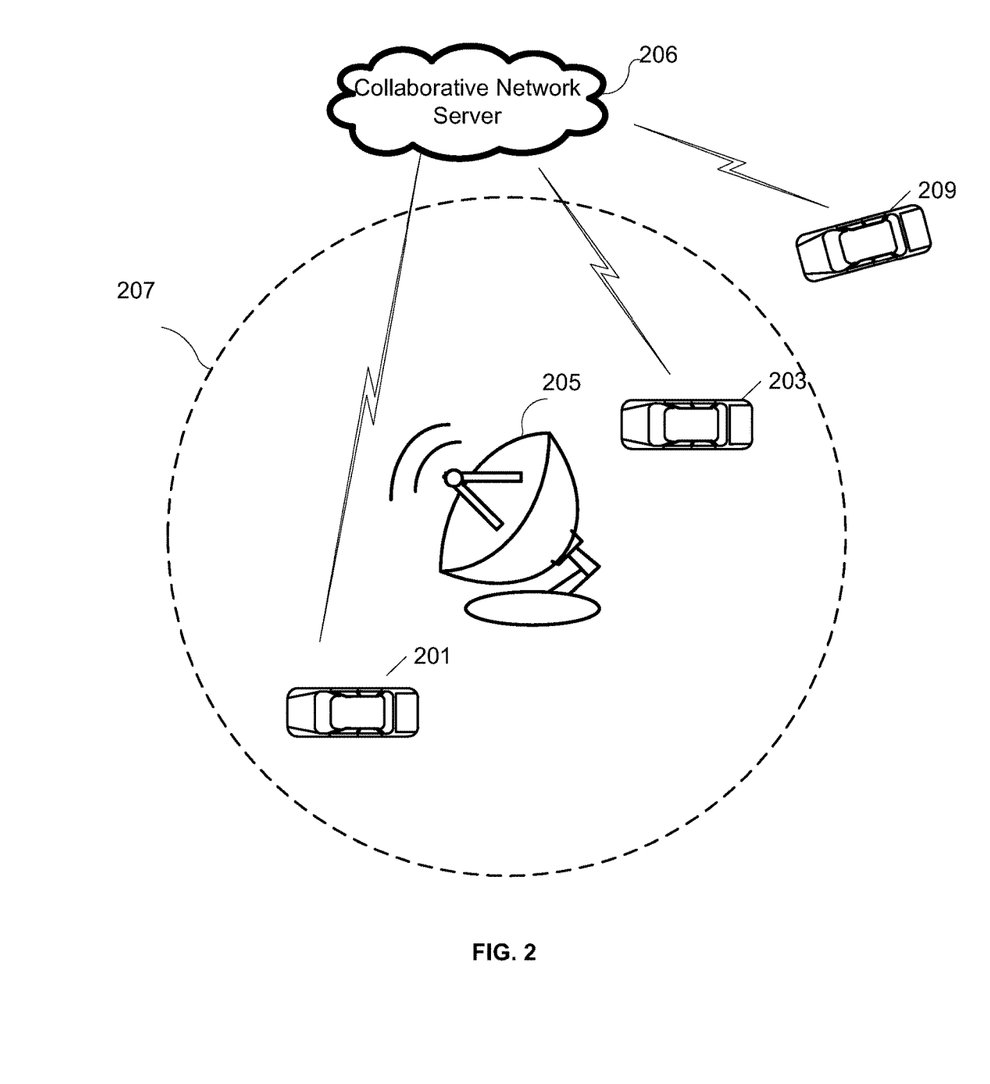
FIG. 2 illustrates an example system of automobiles accessing a collaborative network server of geo-tagged radar interference data as an aid to select WLAN dynamic frequency selection (DFS) channels, in accordance with some embodiments of the present disclosure.

FIG. 2 illustrates an example system of automobiles accessing a collaborative network server 206 of geo-tagged radar interference data as an aid to select WLAN DFS channels, in accordance with some embodiments of the present disclosure. Three vehicles, vehicle 201, vehicle 203, and vehicle 209, are shown.

Vehicle 201, which may have a WLAN DFS master device onboard, may travel into a range of operation 207 of radar 205. In one example, the radar 205 may be an air traffic radar operating at an airport. The WLAN DFS master device may initially operate on a DFS channel before the vehicle 201 enters the radar range of operation 207. If the radar 205 operates on the same DFS channel as the vehicle 201, after the vehicle 201 enters the radar range of operation 207, the DFS-ISM scan of the WLAN DFS master device may detect the radar signal on the operating DFS channel. In addition, the WLAN DFS master device may record the DFS channel of the radar 205, the GPS coordinates of the vehicle 201, and the time at which the DFS-ISM scan detects the radar signal. The recorded GPS coordinates may represent one geographical point on the boundary of the radar range of operation 207. The recorded time may represent a time when the radar 205 is operational. The WLAN DFS master device may upload information on the detected radar signal including the DFS channel of the radar 205, the recorded GPS coordinates and the recorded time to a collaborative network server 206. In one embodiment, WLAN DFS master device may communicate with the collaborative network server 206 over a cellular network operating in GSM, LTE, 5G, or other types of wide area network. In one embodiment, the collaborative network server 206 may be connected to the wide area network through the Internet.

Similarly, the vehicle 203, another vehicle with a WLAN DFS master device onboard, may travel into the radar range of operation 207. If the WLAN DFS master device on the vehicle 203 operates on the same DFS channel as the radar 205, its DFS-ISM scan may similarly detect the radar signal on the operating DFS channel as the vehicle 203 enters the radar range of operation 207. In one embodiment, the DFS channel detected by the vehicle 203 may be the same as the DFS channel detected by the vehicle 201. In one embodiment, the DFS channel detected by the vehicle 203 may be different from the DFS channel detected by the vehicle 201 if the radar 205 changes its operating DFS channel. As in the vehicle 201, the WLAN DFS master device on the vehicle 203 may record the DFS channel of the radar 205, the GPS coordinates of the vehicle 203, and the time at which its DFS-ISM scan detects the radar signal. Thus, the recorded GPS coordinates may represent another geographical point on the boundary of the radar range of operation 207 and the recorded time may represent another time when the radar 205 is operational. The WLAN DFS master device on the vehicle 203 may similarly upload the information on the detected radar signal including the DFS channel of the radar, 205, the recorded GPS coordinates and the recorded time to the collaborative network server 206.

The collaborative network server 206 may store the information on detected radar interference collected from vehicle 201, vehicle 203, and other vehicles into a centralized database. The crowd-sourced database may thus represent the estimated boundaries of the ranges of a plurality of radar zones expressed in GPS coordinates, the DFS channels over which the radars are expected to operate, and the estimated time of their operation. In one embodiment, as the operating parameters of existing radars are modified, new radars come online, or old radars are taken out of service, the crowd-sourced database may be updated or overwritten. Information that has not been updated for a threshold period of time may be declared outdated and may be pruned from the database.

Vehicles whose WLAN devices may want to operate in a DFS channel at a geographical location over a particular time may consult the centralized database for potential radar interference near the desired geographical location and the desired time to determine if the DFS channel is clear or if it may be prudent to switch to another DFS channel to reduce the probability of radar interference. In one embodiment, the collaborative network server 206 may analyze the operating characteristics of radar zones contained in the centralized database to suggest a DFS channel that minimizes the probability of radar interference based on the location and time of a querying vehicle. In one embodiment, a vehicle may periodically send its current GPS coordinates to the collaborative network server 206 to receive information on any possible approaching radar zones. If the information indicates a radar zone is approaching, the vehicle may proactively switch to a DFS channel to steer clear of any radar interference.

For example, vehicle 209 may periodically transmit its GPS coordinates to the collaborative network server 206. The WLAN device onboard the vehicle 209 may be a WLAN DFS master device or a slave device. Based on its expected path of travel, the collaborative network server 207 may consult the centralized database to predict that the vehicle 209 is approaching the boundary of the range of operation 207 of the radar 205. The centralized database may show that the radar 205 is operating at a certain DFS channel. The collaborative network server 206 may transmit the GPS coordinates of one or more points on the boundary of the range of operation 207 at which the vehicle 209 is expected to enter the range of operation 207 of the radar 205 and the expected operating channel of the radar 205. If the WLAN device on the vehicle 209 is operating on the same DFS channel, it may prepare to switch to a different DFS channel before it encounters the radar interference from the radar 205. In one embodiment, the collaborative network server 206 may suggest a DFS channel for the WLAN device to switch to. The vehicle 209 may use the information to switch to a different DFS channel that causes the least interruptions to its WLAN operations.

In one embodiment, if the path of the vehicle is already selected, e.g., using an onboard navigation system, the vehicle may consult the centralized database to predict the possible zones of radar interference along the path. The WLAN device on the vehicle may select a DFS channel that is expected to cause the least or no radar interference. Advantageously, the WLAN device may avoid the interruptions to the WLAN operation associated with switching channels, such as the WLAN interruptions encountered when the WLAN DFS master device performs the DFS-CAC scan on a new channel. For WLAN DFS slave devices as well, the elimination or reduction of channel switching operations, or the ability to switch channels before a vehicle approaches an expected radar zone, reduces interruptions to the WLAN operations and reciprocally reduces interference of the WLAN operations on the radar operations. In one embodiment, the WLAN device may pre-fetch or download the centralized database for offline use.

Figure 3:
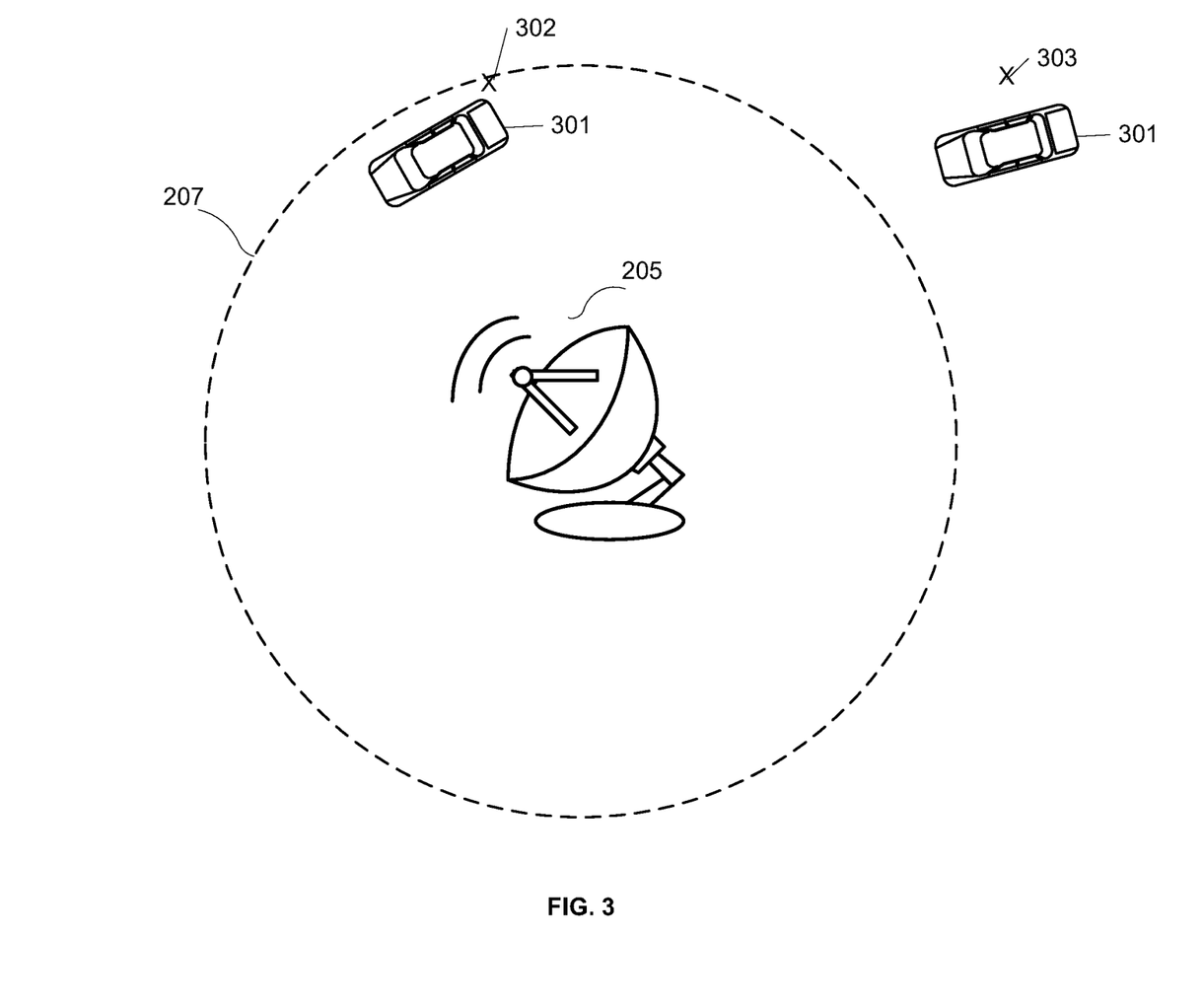
FIG. 3 illustrates an example system of automobiles accessing a local database of geo-tagged radar interference data as an aid to select WLAN DFS channels, in accordance with some embodiments of the present disclosure.

FIG. 3 illustrates an example system of automobiles accessing a local database of geo-tagged radar interference data as an aid to select WLAN DFS channels, in accordance with some embodiments of the present disclosure. In one embodiment, a locally stored database on the vehicle may contain information on radar interference collected only by the vehicle. The WLAN device on the vehicle may query the local database using current or desired GPS coordinates to determine potential radar interference near the GPS coordinates based on a record of locations the vehicle has visited where radar interferences were detected by the vehicle. While the locally stored database eliminates the need for the WLAN device to access a remote collaborative network server 206, it may not be as comprehensive or up-to-date as a crowd-sourced database.

Vehicle 301, which may have a WLAN DFS master device onboard, may travel into a range of operation 207 of a radar 205 at a location 302. If the WLAN DFS master device on the vehicle 301 operates on the same DFS channel as the radar 205, its DFS-ISM scan may detect the radar signal on the DFS channel as the vehicle 301 enters the radar range of operation 207 at location 302. The WLAN DFS master device may record the DFS channel of the radar 205, the GPS coordinates of the vehicle 301 at location 302, and the time at which the radar interference is detected to a local database of the vehicle 301. The local database may be built up by the vehicle 301 over time to contain a local knowledge base of geo-tagged and time-stamped radar zones. At a later time, when the vehicle 301 approaches the range of radar operation 207 of the radar 205 at a location 303, the WLAN device may query the local database based on its current GPS coordinates at location 303 to receive a warning of the nearby radar interference. If the WLAN device is operating on the same DFS channel as the radar 205, the WLAN device may prepare to switch to a different channel before the vehicle 301 encounters the radar interference from the radar 205. In one embodiment, the local database may suggest a DFS channel for the WLAN device to switch to. In one embodiment, if the path of the vehicle 301 is known, the WLAN device may consult the local database to predict the possible zones of radar interference and to select a DFS channel that is expected to cause the least or no radar interference.

In one embodiment, the locally stored database may be a crowd-sourced database the vehicle 301 downloaded or pre-fetched from a collaborative network server (e.g., 206) for offline use. For example, the WLAN device on the vehicle 301 may download the crowd-sourced database into a locally stored database before a trip. The vehicle 301 may then take advantage of the crowd-sourced information to determine potential sources of radar interference during the trip even when the vehicle is offline. In one embodiment, the WLAN device may communicate a planned route of travel to the collaborative network server 206 and may download a portion of the crowd-sourced database containing information on radar zones near the planned route of travel into a locally stored database before the trip or even during the trip. The WLAN device may then switch to an offline mode to access the locally stored database. In one embodiment, the WLAN device of the vehicle 301 may download a locally stored database of another vehicle into the locally stored database of the vehicle 301 using peer-to-peer WLAN operations to leverage information on radar interference collected by another vehicle. In one embodiment, the WLAN device of the vehicle 301 may download a database of another vehicle through a peer-to-peer operation using LTE, 5G, or other types of cellular network.

Figure 4:
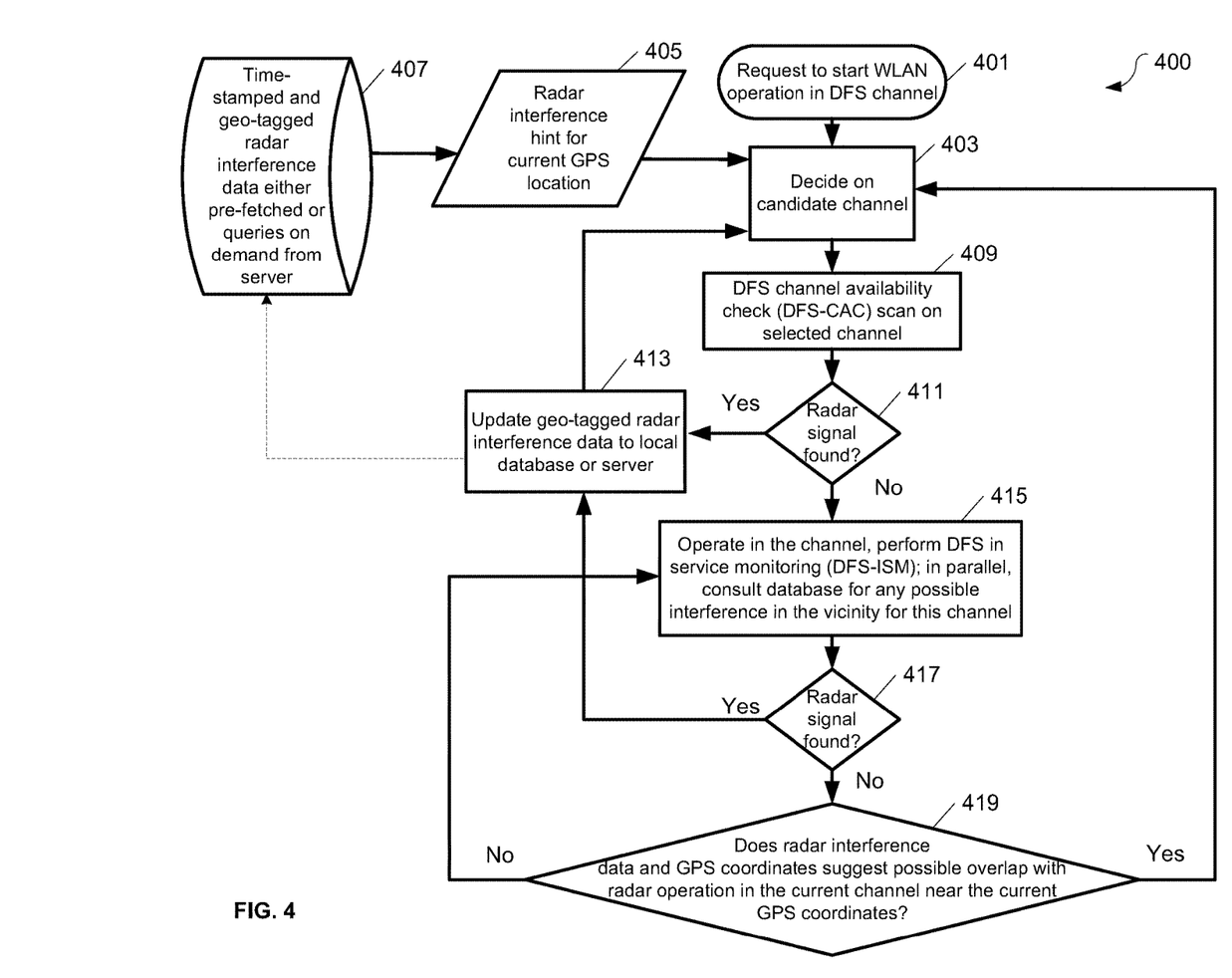
FIG. 4 illustrates a flow diagram of a method for a WLAN device deployed in an automobile to access a collaborative network server or a local database of geo-tagged radar interference data as an aid to select WLAN DFS channels, in accordance with some embodiments of the present disclosure.

FIG. 4 illustrates a flow diagram of a method 400 for a WLAN device deployed in an automobile to access a collaborative network server (e.g., 206) or a local database of geo-tagged radar interference data as an aid to select WLAN DFS channels, in accordance with some embodiments of the present disclosure. Method 400 may be performed by processing logic that may comprise hardware (e.g., circuitry, dedicated logic, programmable logic, a processing device, etc.), software (e.g., instructions running/executing on a processing device), firmware (e.g., microcode), or a combination thereof. In some embodiments, the method 400 may be performed by a WLAN DFS master device, or a processing device included in a WLAN device (e.g., processing device 501 illustrated in FIG. 5).

At 401, a request to start WLAN operation in a DFS channel is initiated. For example, a WLAN DFS master device in a vehicle may request to operate in a DFS channel because only DFS channel are available for WLAN operation in a geographical region or because a scan of open channels indicates that non-DFS channels may not have enough bandwidth to support the desired WLAN operation due to high data traffic, or for any other reasons.

In one embodiment, the WLAN DFS master device may transmit the GPS coordinates of its current location to a database, such as the database 407 containing time-stamped and geo-tagged radar interference data, to receive information on candidate DFS channels for WLAN operation. The database 407 may be a centralized crowd-sourced database of a collaborative network server (e.g., 206) or a locally stored database of the WLAN DFS master device. In one embodiment, the locally stored database may be built up by the WLAN DFS master device over time to contain a local knowledge base of time-stamped and geo-tagged radar zones as discussed in FIG. 3. In one embodiment, the locally stored database may be a crowd-sourced database that the WLAN DFS master device downloaded or pre-fetched from the centralized database for offline use.

In 405, based on the current GPS location of the WLAN DFS master device and the current time, the database 407 may indicate to the WLAN DFS master device DFS channels that may be used by radars operating in the vicinity of the current GPS location. In one embodiment, the database 407 may suggest one or more DFS channels that may be used with a minimal probability of radar interference.

At 403, the method 400 may decide on a candidate DFS channel for WLAN operation. In one embodiment, if the WLAN DFS master device receives from the database 407 information on DFS channels used in radar zones nearby, the WLAN DFS master device may select a DFS channel that steers clear of the potential radar interference. In one embodiment, if the WLAN DFS master device receives from the database 407 suggestions on DFS channels that minimize the probability of radar interference, the WLAN DFS master device may select one of the suggested DFS channels.

At 409, the method 400 may perform a DFS-CAC scan on the selected DFS channel. In one embodiment, the WLAN DFS master device may be required by regulation to perform a DFS-CAC scan for a minimum period of time to ensure the selected DFS channel is free from radar interference before the WLAN DFS master device may start operating in the channel.

At 411, the method 400 may determine if radar signals are detected during the DFS-CAC scan. For example, the WLAN DFS master device may be at a location for which the database 407 may not have any information or may not have the latest information on radar interference. Thus, a DFS-CAC may detect radar interference on the selected DFS channel even when the information from the database 407 does not indicate that the selected DFS channel is used by a nearby radar.

At 413, if radar signals are detected on the selected DFS channel, the method 400 may update the database 407 with a time-stamped and geo-tagged entry containing information on the detected radar signals. For example, the WLAN DFS master device may record the DFS channel over which radar signals are detected, the GPS coordinates of the vehicle and the time of the detection of the radar signals. The WLAN DFS master device may update the database 407 with the recorded information on the DFS channel, the recorded GPS coordinates and the record time. In one embodiment, if the database 407 is a centralized database, the WLAN DFS master device may upload the information to the collaborative network server (e.g., 206) to update the crowd-sourced database. The WLAN DFS master device may select a new candidate DFS channel by consulting the database 407 and the method 400 may repeat in 403, 409, and 411 until a selected DFS channel free of channel interference is found during the DFS-CAC scan.

At 415, if radar signals are not detected on the selected DFS channel, the method 400 may start WLAN operation on the selected DFS channel. In parallel, the method 400 may perform a DFS-ISM scan to monitor for any radar signals that may appear in the operating channel as the vehicle moves. The method 400 may continually consult the database 407 based on the current GPS coordinates of the vehicle to determine if the operating channel is likely to encounter radar interference, for example based on the current location of the vehicle or its projected path.

At 417, if radar signals are detected on the operating channel during the DFS-ISM scan, the method 400 may update the database 407 with a time-stamped and geo-tagged entry containing information on the detected radar signals. For example, the WLAN DFS master device may record the DFS operating channel over which radar signals are detected, the GPS coordinates of the vehicle and the time of the detection of the radar signals. The WLAN DFS master device may update the database 407 with the recorded information on the DFS operating channel, the recorded GPS coordinates and the record time. The WLAN DFS master device may select a new candidate DFS channel for WLAN operation in 403 by consulting the database 407 and the method 400 may repeat the DFS-CAC and DFS-ISM scans in 409, 411, 415, and 417.

At 419, if radar signals are not detected on the operating channel during the DFS-ISM scan, the method 400 may continue WLAN operation on the operating channel. The method 400 may continually consult the database 407 based on the current GPS coordinates of the vehicle to determine if the operating channel is likely to encounter radar interference. For example, based on the projected path of travel of the vehicle, if radar interference is expected on the operating channel, the WLAN DFS master device may switch to a different operating channel before the radar interference occurs. The WLAN DFS master device may select a new candidate DFS channel for WLAN operation in 403 by consulting the database 407 and the method 400 may repeat the DFS-CAC and DFS-ISM scans in 409, 411, 415, and 417.

While the method 400 is illustrated using a WLAN DFS master device, a WLAN DFS slave device may also practice some steps of method 400 to access a collaborative network server (e.g., 206) or a local database of time-stamped, geo-tagged radar interference data as an aid to select WLAN DFS channels. For example, in 403 a slave device may decide on a candidate channel by receiving from the database 407 information on DFS channels used in radar zones nearby or suggestions on DFS channels that minimize the probability of radar interference. In 419, the slave device may select an operating channel and may continually consult the database 407 based on the current GPS coordinates of the vehicle to determine if the operating channel is likely to encounter radar interference. If radar interference is expected on the operating channel, the slave device may switch to a different operating channel before the radar interference occurs.

Figure 5:
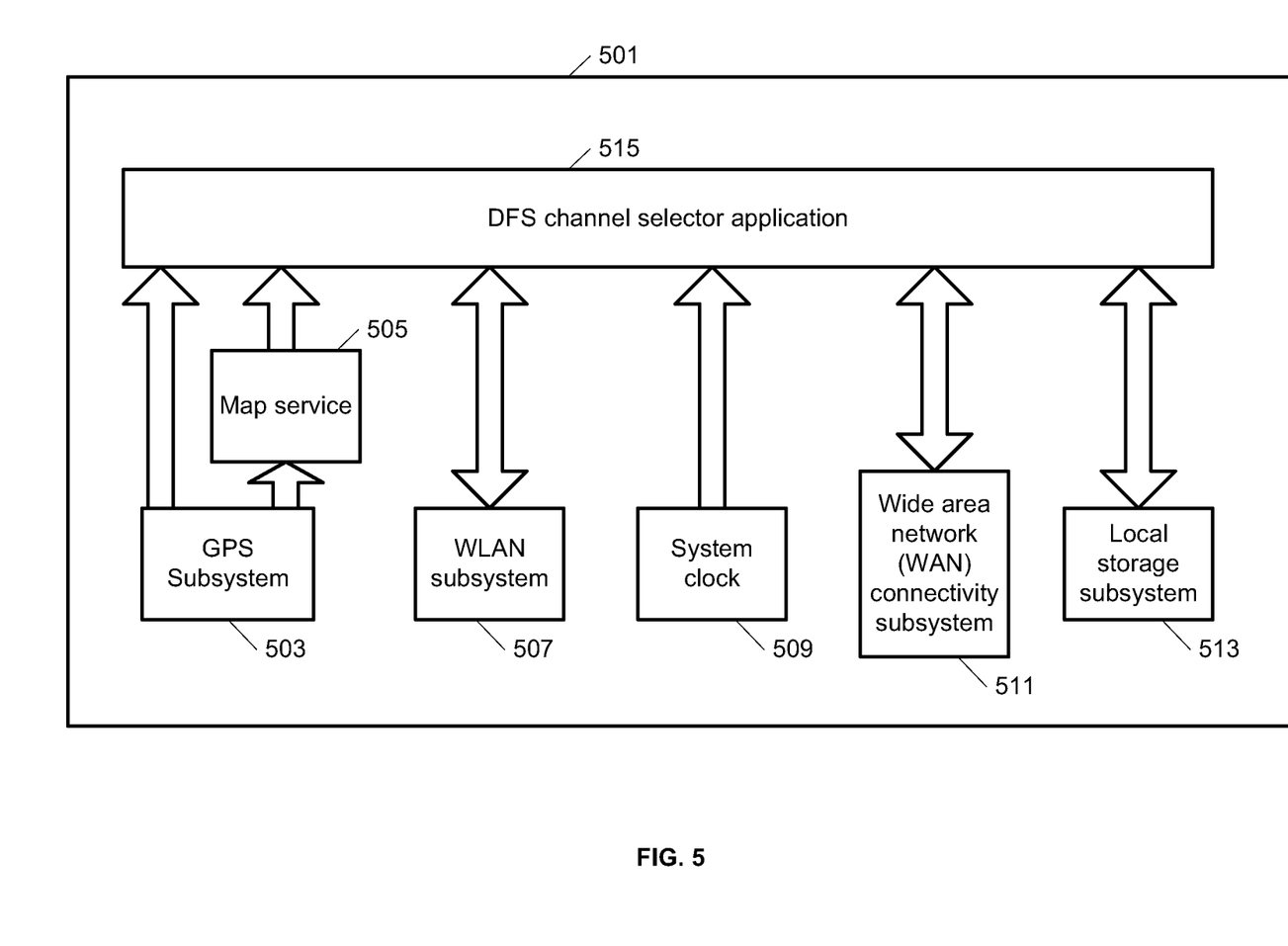
FIG. 5 is a block diagram of a WLAN DFS device deployed in an automobile configured to access a collaborative network server or a local database of geo-tagged radar interference data as an aid to select WLAN DFS channels, in accordance with some embodiments of the present disclosure.

FIG. 5 is a block diagram of a WLAN DFS device 501 deployed in an automobile configured to access a collaborative network server (e.g., 206) or a local database of geo-tagged radar interference data as an aid to select WLAN DFS channels, in accordance with some embodiments of the present disclosure. The WLAN DFS device 501 may be the WLAN device on the vehicles 201, 205, 209, 301, 303, and may practice the steps of method 400.

The WLAN DFS device 501 may be a WLAN DFS master device or a slave device. The WLAN DFS device 501 may include a GPS subsystem 503, a map service 505, a WLAN subsystem 507, system clock 509, a wide area network (WAN) connectivity subsystem 511, a local storage subsystem 513, and a DFS channel selector application 515.

The GPS subsystem 503 may be configured to provide the GPS coordinates of the WLAN DFS device 501. The GPS coordinates may be used to geo-tag a detected radar signal for a WLAN DFS master device. The map service 505 may be configured to map the GPS coordinates provided by the GPS subsystem 503 to a path of travel and may also provide navigation services for a vehicle. The path of travel may be used by a database of geo-tagged, time-stamped radar interference to predict the possible zones of radar interference along the path.

The WLAN subsystem 507 may be configured to use a selected channel for WLAN operation. For example, the WLAN subsystem 507 may be configured to transmit or receive data packet, control frames, etc., with other WLAN DFS devices or an AP over a WLAN channel. The system clock 509 may be configured to keep track of the system time used to time stamp a detected radar signal by a WLAN DFS master device. In one embodiment, the GPS subsystem 503 may be configured to provide the system time.

The WAN connectivity subsystem 511 may be configured by a WLAN DFS master device to upload information on detected radar signals including the DFS channels of the detected radar signals, recorded GPS coordinates and recorded times at which the radar signals are detected to a collaborative network server (e.g., 206). The WAN connectivity subsystem 511 may also be configured by both a WLAN DFS master and slave device to transmit the current GPS coordinates of the WLAN DFS device 501 and to receive information on radar interference near the current GPS coordinates from the collaborative network server (e.g., 206).

The local storage subsystem 513 may be configured to store a local database of geo-tagged, time-stamped radar interference data. In one embodiment, the local storage subsystem 513 may contain a local knowledge base of geo-tagged time-stamped radar zones detected by the WLAN DFS device 501. In one embodiment, the local storage subsystem 513 may store the crowd-sourced centralized database of geo-tagged time-stamped radar zones downloaded from the collaborative network server (e.g., 206).

The DFS channel selector application 515 may be run on a processor to perform one or more of the operations in the method 400 of FIG. 4 for the WLAN DFS device 501 to access the collaborative network server (e.g., 206) or the local storage subsystem 513 to obtain geo-tagged time-stamped radar interference information as an aid to select WLAN DFS channels for WLAN operation.

In one embodiment, the WLAN DFS device 501 may include a memory and a processing device. The memory may be synchronous dynamic random access memory (DRAM), read-only memory (ROM)), or other types of memory, which may be configured to store the DFS channel selector application 515 or the local storage subsystem 513. The processing device may be provided by one or more general-purpose processing devices such as a microprocessor, central processing unit, or the like. In an illustrative example, processing device may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device may also comprise one or more special-purpose processing devices such as an application specific integrated circuit (ASIC), a field programmable gate array (FPGA), a digital signal processor (DSP), network processor, or the like. The processing device may be configured to execute the operations described herein, in accordance with one or more aspects of the present disclosure, for performing the operations and steps discussed herein.

Figure 6:
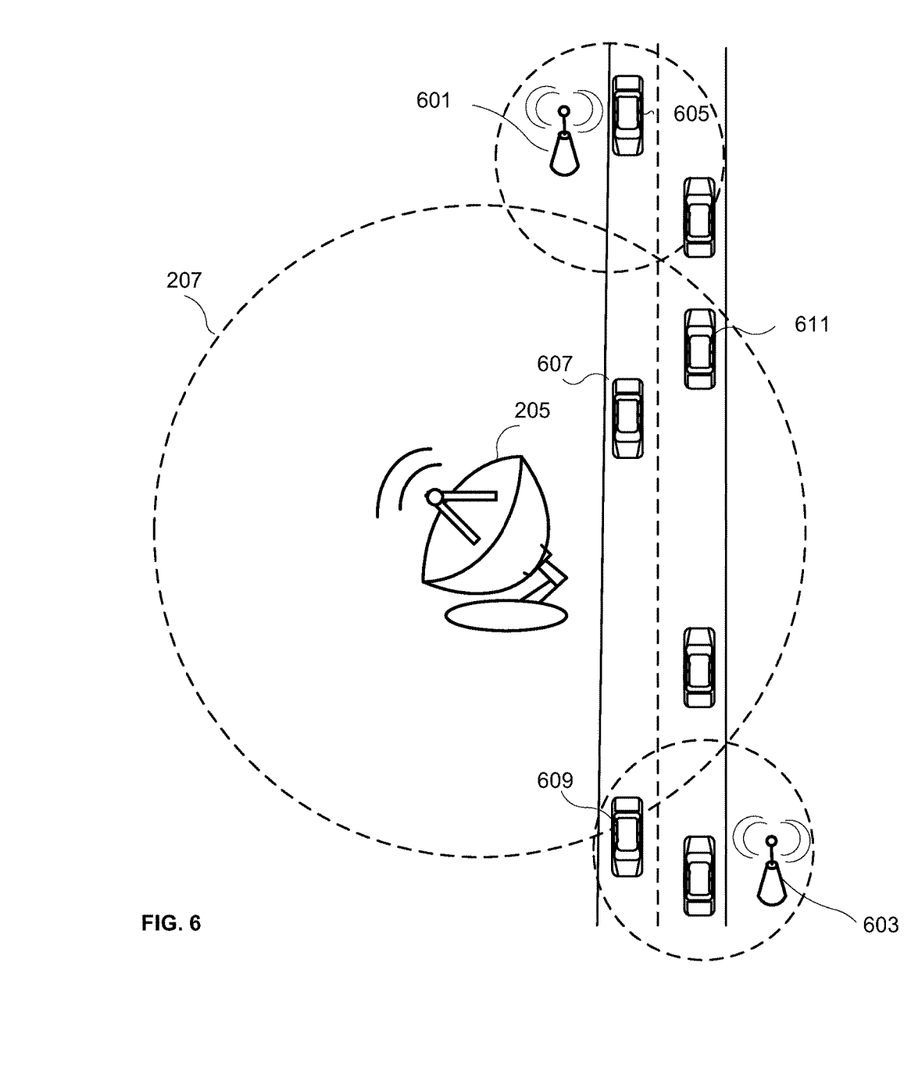
FIG. 6 illustrates an example system of automobiles receiving DFS action frames from beaconing devices as an aid to select WLAN DFS channels, in accordance with some embodiments of the present disclosure.

FIG. 6 illustrates an example system of automobiles receiving DFS action frames from beaconing devices as an aid to select WLAN DFS channels, in accordance with some embodiments of the present disclosure.

A radar 205 is operating on a WLAN DFS channel. The radar 205 may have a range of operation 207. For example, the radar 205 may be an air traffic radar operating at an airport. A dedicated WLAN beaconing device, which may also be referred to as a WLAN DFS action frame beaconing device 601 or 603, may be installed at the boundary of the radar range of operation 207. The WLAN DFS action frame beaconing device may broadcast special WLAN action frames, which may also be referred to as DFS beacons, on the DFS channel of the radar 205 to warn WLAN devices on vehicles approaching the radar range of operation 207 that the radar 205 is operating nearby and to steer clear of the DFS channel used by the radar 205.

The DFS beacons may carry information including a time stamp, one or more WLAN DFS channels used by the radar 205 to be avoided by WLAN devices, one or more recommended WLAN DFS channels that WLAN devices may use as alternative channels, information on the radar range of operation 207, a digital signature, etc. In one embodiment, the WLAN DFS action frame beaconing devices 601/603 may scan the traffic on the clear DFS channels not used by the radar 205 when the beaconing devices 601/603 recommend the alternative channels to allow the WLAN traffic of the WLAN devices to be more uniformly distributed on the clear DFS channels. In one embodiment, the WLAN DFS action frame beaconing devices 601/603 may prioritize the alternative channels so the channels that are less loaded may be recommended first. In one embodiment, the information on the radar range of operation 207 may be represented by the GPS coordinates of the boundary of the radar range of operation 207. Such GPS coordinates of the boundary may define the region of validity of the information carried by the DFS beacons. In one embodiment, the digital signature may be used by WLAN devices to check the authenticity or validity of the information carried by the DFS beacons. In one embodiment, the DFS beacons may be transmitted periodically.

Because the WLAN DFS action frame beaconing device 601 broadcasts the DFS beacons on the DFS channel used by the radar 205, a WLAN device operating on the same DFS channel may receive the DFS beacons to quickly discover radar interference on the DFS channel and to switch to another channel, for example to switch one of the alternative channels recommended by the DFS beacons. In one embodiment, the WLAN DFS action frame beaconing device 601 may broadcast the DFS beacons outside the radar range of operation 207 so the transmissions of the DFS beacons do not themselves cause interference to the operation of the radar 205. Advantageously, a vehicle approaching the radar range of operation 207 and whose WLAN device is operating on the DFS channel of the radar 205 may detect the DFS beacons and may switch its operating channel to a clear DFS channel before the vehicle enters the radar range of operation 207 so as to minimize any interference to the radar operation. In addition, because the DFS beacons are transmitted as WLAN packets, both WLAN DFS master and slave devices may detect the DFS beacons to quickly steer free of DFS channels carrying radar signals.

For example, a WLAN device on a vehicle 605 approaching the radar range of operation 207 from one direction may receive the DFS beacons from the beaconing device 601 if the WLAN device is operating on the same DFS channel as the radar 205. The WLAN device may authenticate the validity of the DFS beacons using the digital signature carried in the DFS beacons. The WLAN device may receive the region of validity of the information carried by the DFS beacons expressed as the GPS coordinates of the boundary of the radar range of operation 207. Based on this and the projected path of travel, the WLAN device may determine that the vehicle 605 may enter the radar range of operation 207. The WLAN device may receive from the DFS beacons the DFS channels to avoid and the recommended alternative DFS channels to migrate to. In one embodiment, the DFS channels to avoid may include the current operating channel of the WLAN device and other DFS channels that may be used by the radar 205. The WLAN device may switch its operating channel to one of the recommended alternative DFS channels as a new channel before the vehicle 605 enters the radar range of operation 207. During the time the vehicle 605 is within the radar range of operation 207, the WLAN device may continue WLAN operation using the new DFS channel without interfering with the operation of the radar 205. When the vehicle 605 exits the range of radar operation 207, the WLAN device may stay with the new channel or may switch back to its former operating channel.

Similarly, a WLAN device on another vehicle 609 approaching the radar range of operation 207 from another direction may receive the DFS beacons from the beaconing device 603 if the WLAN device is operating on the same DFS channel as the radar 205. Similarly, the WLAN device may switch to a new channel before the vehicle 609 enters the radar range of operation 207. The new channel used by the WLAN device on the vehicle 609 may be the same or different from the new channel used by the WLAN device on the vehicle 605. In addition to avoiding interference to the operation of the radar 205, the new DFS channels used by the vehicles 605, 609, and other vehicles 607, 611 for WLAN operation may be prioritized by the beaconing devices 601/603 to more uniformly distribute the loading of WLAN traffic on the new DFS channels. In addition, even WLAN DFS slave devices that are not normally capable of detecting radar signals may be able to receive the DFS beacons to switch to the new DFS channels to avoid interfering with the operation of the radar 205.

Figure 7:
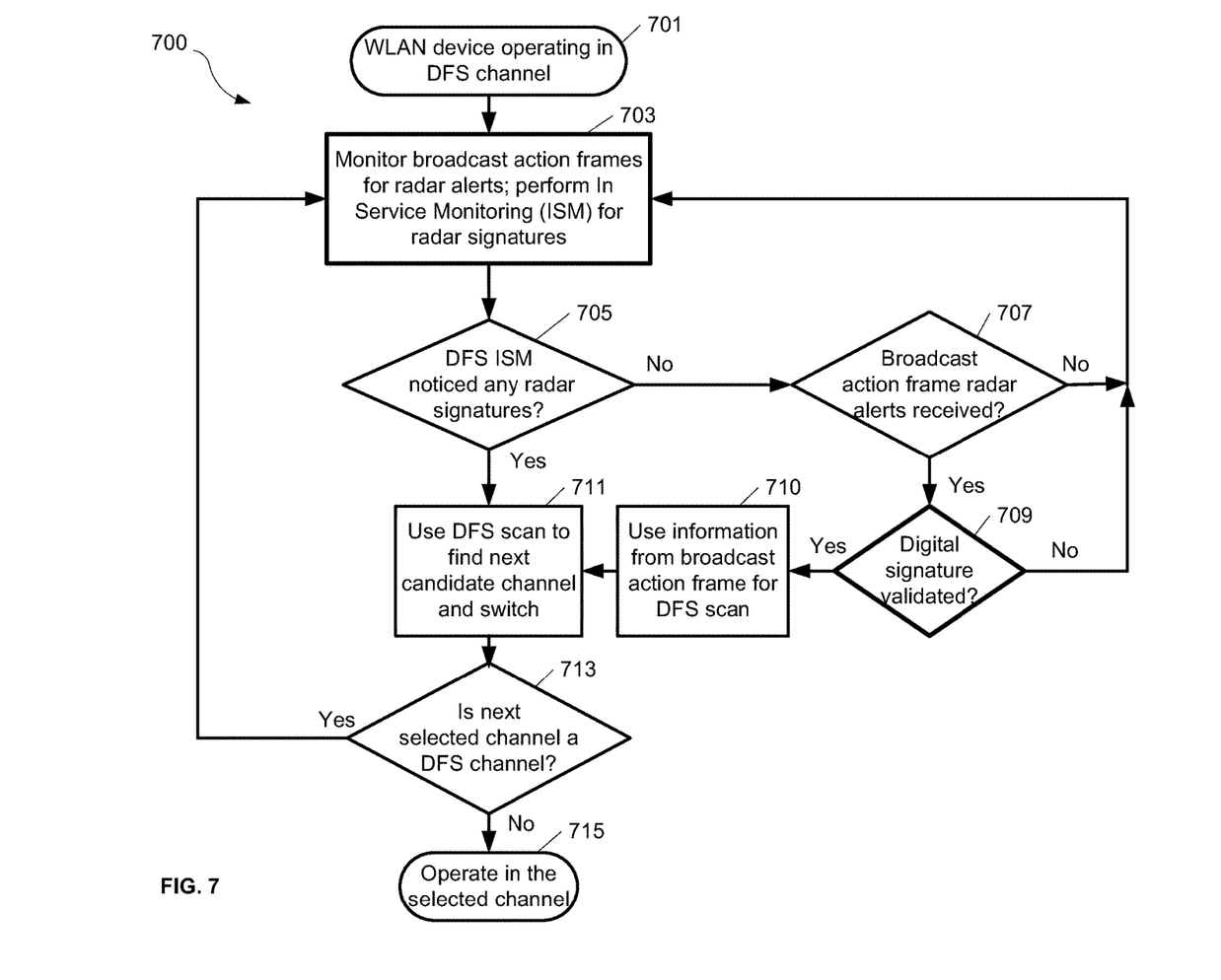
FIG. 7 illustrates a flow diagram of a method for a WLAN device deployed in an automobile to receive DFS beacons from beaconing devices as an aid to select WLAN DFS channels, in accordance with some embodiments of the present disclosure.

FIG. 7 illustrates a flow diagram of a method 700 for a WLAN device deployed in an automobile to receive DFS beacons from beaconing devices as an aid to select WLAN DFS channels, in accordance with some embodiments of the present disclosure. The method 700 may be performed by processing logic that may comprise hardware (e.g., circuitry, dedicated logic, programmable logic, a processor, a processing device, a central processing unit (CPU), a multi-core processor, a system-on-chip (SoC), etc.), software (e.g., instructions running/executing on a processing device), firmware (e.g., microcode), or a combination thereof. In some embodiments, the method 700 may be performed by a WLAN DFS master device, a WLAN DFS slave device, or a processing device included in a WLAN device (e.g., processing device 811 illustrated in FIG. 8B).

At 701, a WLAN device may operate in a DFS channel. For example, a WLAN DFS master or slave device in a vehicle may operate in a DFS channel because only DFS channel are available for WLAN operation in a geographical region or because a scan of open channels indicates that non-DFS channels may not have enough bandwidth to support the desired WLAN operation due to high data traffic, or for any other reasons. In one embodiment, the WLAN device, before starting the operation in this DFS channel, may have performed the DFS-CAC scan to confirm that there are no radars operating in that DFS channel.

At 703, the WLAN device may monitor the DFS beacons on the DFS channel for alerts of radars operating on the same DFS channel. In parallel, the WLAN device may perform a DFS-ISM scan to monitor for any radar signals that may appear in the operating channel. For example, a WLAN DFS master device may perform the DFS-ISM scan on the operating channel in addition to monitoring the DFS beacons. For a WLAN DFS slave device that does not have the capability to detect radar signals, it may monitor the operating channel for a message from an associated WLAN DFS master device indicating that radar signatures have been detected by the WLAN DFS master device in addition to monitoring the DFS beacons.

At 705, the WLAN DFS master device may determine if radar signals are detected on the operating channel through the DFS-ISM scan. At 711, if radar signals are detected on the operating channel, the WLAN DFS master device may determine a candidate channel to switch to and may perform a DFS-CAC scan if the channel is a DFS channel. The WLAN DFS master device may repeat this process over the entire candidate channel list until it finds a candidate channel that is free of radar operation. In one embodiment, the WLAN DFS master device may transmit a message on the operating channel to associated slave devices to signal the slave device to switch from the operating channel. A slave device that receives the message may determine a candidate channel to switch to if the slave device is currently using the operating channel.

At 713, the WLAN device may determine if the candidate channel is a DFS channel. If the candidate channel is a DFS channel, the WLAN device may switch to the candidate channel as a new WLAN operating channel and may monitor the DFS beacons on the new channel for alerts of radars operating on the new channel at 703. In parallel, the WLAN device may perform a DFS-ISM scan to monitor for any radar signals that may appear in the new channel if the WLAN device is WLAN DFS master device. If the candidate channel is not a DFS channel, the WLAN device may switch to the candidate channel for WLAN operation at 715.

At 707, if the WLAN DFS master device does not detect radar signals on the operating channel through the DFS-ISM scan, or if the WLAN DFS slave device does not receive a message from an associated WLAN DFS master device indicating that radar signatures have been detected by the WLAN DFS master device, the WLAN device may determine if a DFS beacon has been received on the operating channel.

If a DFS beacon has not been received on the operating channel, the WLAN device may continue to monitor the DFS beacons on the operating channel for alerts of radars operating on the operating channel at 703. In parallel, the WLAN device may continue to perform a DFS-ISM scan to monitor for any radar signals that may appear in the operating channel if the WLAN device is WLAN DFS master device, or if the WLAN device is a slave device, to continue to monitor the operating channel for a message from an associated WLAN DFS master device indicating that radar signatures have been detected.

If a DFS beacon has been received on the operating channel, the WLAN device may authenticate the validity of the DFS beacons using the digital signature carried in the DFS beacons at 709. If the DFS beacons are authenticated, at 710 the WLAN device may receive the information on the region of validity of the DFS beacons, which may indicate a region of radar operation. Based on this information and the projected path of travel of the vehicle, the WLAN device may determine that the vehicle may enter the region of radar operation. The WLAN device may receive from the DFS beacons the DFS channels to avoid that may include the current operating channel, and the recommended alternative DFS channels to migrate to. At 711, the WLAN device may switch to one of the recommended alternative DFS channels as a new channel for WLAN operation before the vehicle enters the region of radar operation. The WLAN device may then determine if the new channel is a DFS channel at 713. If the new channel is a DFS channel, the WLAN device may monitor the DFS beacons on the new channel for alerts of radars operating on the new channel in 703. In parallel, the WLAN device may perform a DFS-ISM scan to monitor for any radar signals that may appear in the new channel if the WLAN device is WLAN DFS master device. If the new channel is not a DFS channel, the WLAN device may operate using the new channel at 715.

Figure 8A:
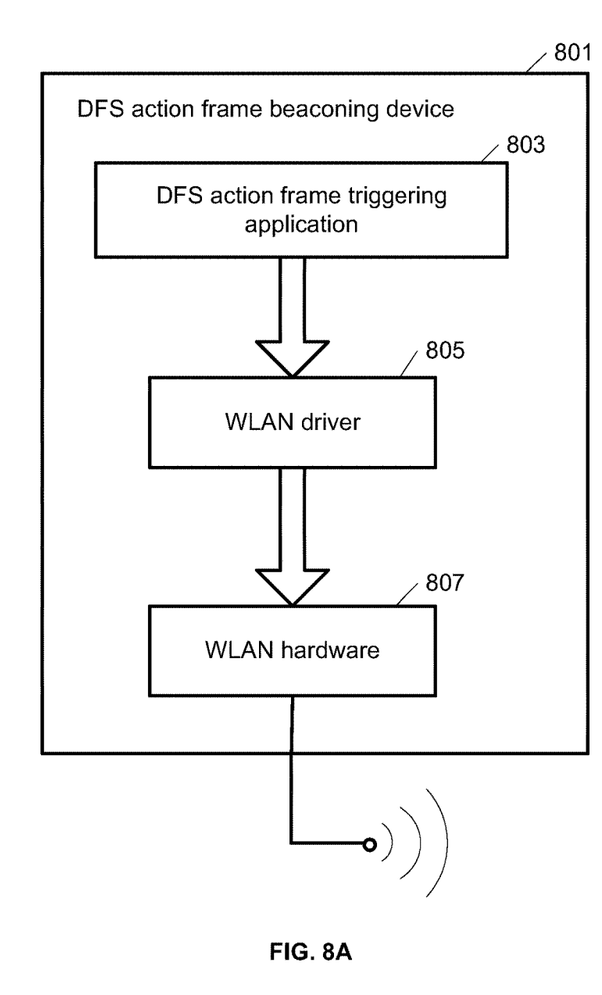
FIG. 8A is a block diagram of a DFS action frame beaconing device, in accordance with some embodiments of the present disclosure.

FIG. 8A is a block diagram of a DFS action frame beaconing device 801, in accordance with some embodiments of the present disclosure. The beaconing device 801 may be the beacon device 601 or 603 of FIG. 6.

The DFS action frame beaconing device 801 may include DFS action frame triggering application 803, WLAN driver 805, and WLAN hardware 807. The DFS action frame triggering application 803 may run on a processor to periodically generate DFS beacon information including a time stamp, one or more WLAN DFS channels used by a nearby radar, one or more recommended WLAN DFS channels that WLAN devices may use as alternative channels, information on the range of operation of the radar, a digital signature, etc. In one embodiment, the DFS action frame triggering application 803 may scan, using the WLAN hardware 807, the traffic on the clear DFS channels not used by the radar when recommending the alternative channels to allow the WLAN traffic of the WLAN devices to be more uniformly distributed on the clear DFS channels.

The WLAN driver 805 may run on a processor to generate WLAN packets with payload that carries the DFS beacon information provided by the DFS action frame triggering application 803. The WLAN hardware 807 may be configured to periodically transmit the WLAN packets as DFS action frames or DFS beacons on the DFS channel used by the radar.

Figure 8B:
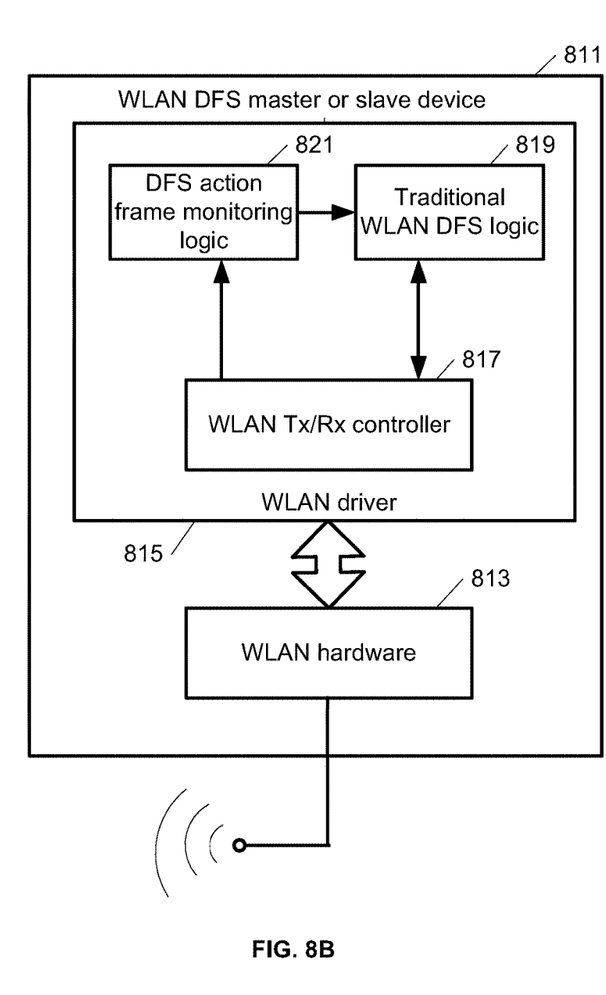
FIG. 8B is a block diagram of a WLAN DFS device deployed in an automobile configured to receive DFS action frames from beaconing devices as an aid to select WLAN DFS channels, in accordance with some embodiments of the present disclosure.

FIG. 8B is a block diagram of a WLAN DFS device 811 deployed in an automobile configured to receive DFS action frames from beaconing devices (e.g., 601, 603, 801) as an aid to select WLAN DFS channels, in accordance with some embodiments of the present disclosure. The WLAN DFS device 811 may be a WLAN DFS master device or a slave device. The WLAN DFS device 811 may be the WLAN device on the vehicles 605, 607, 609, 611, and may practice the steps of method 700.

The WLAN DFS device 811 may include WLAN hardware 813 and WLAN driver 815. The WLAN driver 815 may include WLAN Tx/RX controller 817, traditional WLAN DFS logic 819, and DFS action frame monitoring logic 821. The WLAN hardware may be configured to transmit or receive WLAN packets on an operating channel, including receiving DFS beacon from the DFS action frame beaconing device 801.

The WLAN Tx/Rx controller 817 may be configured to demodulate and decode received WLAN packets and to encode and modulate WLAN packets for transmission. The DFS action frame monitoring logic 821 may be configured to detect DFS beacons. When a DFS beacon is received, the DFS action frame monitoring logic 821 may authenticate the validity of the DFS beacons using the digital signature carried in the DFS beacon. Once the DFS beacon is authenticated, the DFS action frame monitoring logic 821 may obtain information on one or more WLAN DFS channels used by a nearby radar, one or more recommended WLAN DFS channels that WLAN DFS devices 811 may use as alternative channels, information on the range of operation of the radar, etc.

If the current operating channel is used by a nearby radar, the traditional WLAN DFS logic 819 may be configured to switch to one of the recommended WLAN DFS channels obtained from the DFS beacon or a non-DFS channel, if available. In one embodiment, if the WLAN DFS device 811 is a WLAN DFS master device and if radar signals are detected on the operating channel through DFS-CAC or DFS-ISM scans, the traditional WLAN DFS logic 819 may be configured to generate a message that will be transmitted on the current operating channel to signal to associated slave devices to switch from the current operating channel. In one embodiment, if the WLAN DFS device 811 is a WLAN DFS slave device and if it receives a message from the associated WLAN DFS master device to switch its current operating channel, the traditional WLAN DFS logic 819 may be configured to select a new channel for WLAN operation.

In one embodiment, the DFS action frame beaconing device 801 or the WLAN DFS device 811 may include a memory and a processing device. The memory may be synchronous dynamic random access memory (DRAM), read-only memory (ROM)), or other types of memory, which may be configured to store the code to perform the function of the WLAN driver 813 or 815. The processing device may be provided by one or more general-purpose processing devices such as a microprocessor, central processing unit, or the like. In an illustrative example, processing device may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device may also comprise one or more special-purpose processing devices such as an application specific integrated circuit (ASIC), a field programmable gate array (FPGA), a digital signal processor (DSP), network processor, or the like. The processing device may be configured to execute the operations described herein, in accordance with one or more aspects of the present disclosure, for performing the operations and steps discussed herein.

Unless specifically stated otherwise, terms such as "receiving," "generating," "verifying," "performing," "correcting," "identifying," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions. The machine-readable medium may be referred to as a non-transitory machine-readable medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Also, the terms "first," "second," "third," "fourth," etc., as used herein are meant as labels to distinguish among different elements and may not necessarily have an ordinal meaning according to their numerical designation. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of operating a wireless local area network (WLAN) device, comprising:
    operating the WLAN device on a first dynamic frequency selection (DFS) channel of a plurality of DFS channels;
    scanning, by the WLAN device, the first DFS channel for presence of a radar signal from a radar;
    receiving, by the WLAN device, aiding information obtained by one or more WLAN devices capable of scanning the DFS channels, wherein the aiding information indicates that the first DFS channel is used by the radar, and wherein the aiding information received by the WLAN device comprises a broadcast WLAN action frame received, while overlapping one or more radar signals from the radar, from a second WLAN device over the first DFS channel and outside a radar interference range of the radar to avoid interference of the WLAN action frame with an operation of the radar, the aiding information indicating the first DFS channel is used by the radar and including a geo-tagged radar zone of the radar;
    identifying a digital signature included in the broadcast WLAN action frame;
    authenticating, using the digital signature, the aiding information;
    determining, based on the aiding information, that the WLAN device is approaching the geo-tagged radar zone of the radar responsive to authenticating the aiding information; and
    changing operating the WLAN device from using the first DFS channel to a second DFS channel of the plurality of DFS channels in response to authenticating the aiding information and the aiding information indicating the first DFS channel being used by the radar.

2. The method of claim 1, wherein receiving by the WLAN device the aiding information further comprises receiving the aiding information from a crowd-sourced database over a cellular network, wherein the crowd-sourced database contains a plurality of geo-tagged radar zones detected by a plurality of the WLAN devices capable of scanning the DFS channels.

3. The method of claim 2, wherein one of the plurality of geo-tagged radar zones comprises a geographical area in which an operating radar has been detected by one of the plurality of WLAN devices capable of scanning the DFS channels, and one or more DFS channels of the plurality of DFS channels detected as being used by the operating radar at the geographical area.

4. The method of claim 3, further comprising transmitting by the WLAN device to the crowd-sourced database a geographical position of the WLAN device, and wherein the received aiding information comprises a received geo-tagged radar zone of the plurality of geo-tagged radar zones, wherein the geographical area of the received geo-tagged radar zone indicates that the operating radar is in a vicinity of the geographical position of the WLAN device.

5. The method of claim 3, wherein the received aiding information indicating the first DFS channel being used by the radar comprises information indicating that the first DFS channel overlaps with the one or more DFS channels detected as being used by the operating radar at one of the plurality of the geo-tagged radar zones.

6. The method of claim 1, wherein the broadcast WLAN action frame carries information on one or more DFS channels of the plurality of DFS channels being used by the radar and one or more alternative DFS channels available for WLAN operation.

7. The method of claim 6, wherein the received aiding information indicating the first DFS channel being used by the radar comprises information indicating that the first DFS channel overlaps with the one or more DFS channels of the plurality of DFS channels being used by the radar, and wherein the second DFS channel is selected from one of the one or more alternative DFS channels.

8. A wireless local area network (WLAN) device, comprising:
    a WLAN interface configured to operate the WLAN device on a first dynamic frequency selection (DFS) channel of a plurality of DFS channels; and
    a processing device configured to:
        scan the first DFS channel for presence of a radar signal from a radar;
        receive aiding information obtained by one or more WLAN devices capable of scanning the DFS channels, wherein the aiding information indicates that the first DFS channel is used by the radar, and wherein the aiding information received by the WLAN device comprises a broadcast WLAN action frame received, while overlapping one or more radar signals from the radar, from a second WLAN device over the first DFS channel and outside a radar interference range of the radar to avoid interference of the WLAN action frame with an operation of the radar, wherein the aiding information indicating the first DFS channel is used by the radar and including a geo-tagged radar zone of the radar;
identify a digital signature included in the broadcast WLAN action frame;
authenticate, using the digital signature, the aiding information;
determine, based on the aiding information, that the WLAN device is approaching the geo-tagged radar zone of the radar responsive to authenticating the aiding information; and
switch the first DFS channel used for WLAN operation to a second DFS channel of the plurality of DFS channels in response to authenticating the aiding information and the aiding information indicating the first DFS channel being used by the radar.

9. The WLAN device of claim 8, wherein the aiding information is further received from a crowd-sourced database over a cellular network, and wherein the crowd-sourced database contains a plurality of geo-tagged radar zones detected by a plurality of the WLAN devices capable of scanning the DFS channels.

10. The WLAN device of claim 9, wherein one of the plurality of geo-tagged radar zones comprises a geographical area in which an operating radar has been detected by one of the plurality of WLAN devices capable of scanning the DFS channels, and one or more DFS channels of the plurality of DFS channels detected as being used by the operating radar at the geographical area.

11. The WLAN device of claim 10, wherein the processing device is further configured to transmit to the crowd-sourced database a geographical position of the WLAN device, and wherein the received aiding information comprises a received geo-tagged radar zone of the plurality of geo-tagged radar zones, wherein the geographical area of the received geo-tagged radar zone indicates that the operating radar is in a vicinity of the geographical position of the WLAN device.

12. The WLAN device of claim 10, wherein the received aiding information indicating the first DFS channel being used by the radar comprises information indicating that the first DFS channel overlaps with the one or more DFS channels detected as being used by the operating radar at one of the plurality of the geo-tagged radar zones.

13. The WLAN device of claim 8, wherein the broadcast WLAN action frame carries information on one or more DFS channels of the plurality of DFS channels that are used by the radar and one or more alternative DFS channels available for the WLAN operation.

14. The WLAN device of claim 13, wherein the received aiding information indicating the first DFS channel being used by the radar comprises information indicating that the first DFS channel overlaps with the one or more DFS channels of the plurality of DFS channel that are used by the radar, and wherein the second DFS channel is selected from one of the one or more alternative DFS channels.

15. A communication device, comprising:
a processing device configured to:
generate information on a geo-tagged radar zone comprising a geographical area in which an operating radar operates, and one or more dynamic frequency selection (DFS) channels being used by the operating radar at the geographical area; and
broadcast, while overlapping one or more radar signals from the radar, WLAN action frame including the generated information over a first DFS channel and outside a radar interference range of the operating radar to avoid interference of the WLAN action frame with an operation of the operating radar, the WLAN action frames causing a WLAN device approaching the geo-tagged radar zone to authenticate the WLAN action frame using a digital signature included in the WLAN action frame and steer clear of the DFS channels used by the operating radar responsive to authenticating the WLAN action frame.

16. The communication device of claim 15, wherein the processing device is further configured to:
scan traffic on one or more clear DFS channels not used by the operating radar; and
broadcast, using the WLAN action frames, information on the clear DFS channels for the WLAN device to switch from using the DFS channels used by the operating radar to the clear DFS channels.

* * * * *